1,434,965

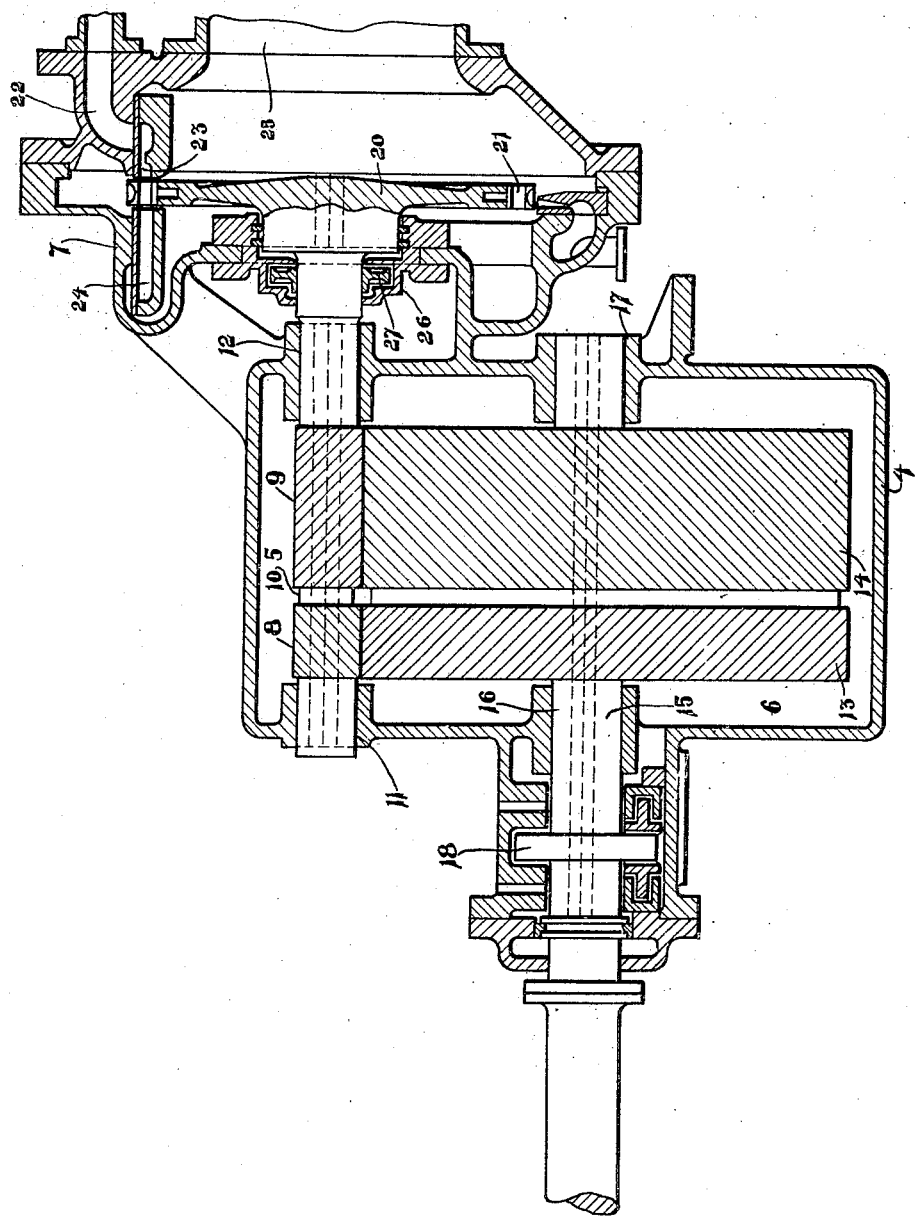
H. F. SCHMIDT.
REDUCTION GEARING.
APPLICATION FILED MAY 2, 1921.
1,434,965.
Patented Nov. 7, 1922.
Henry F. Schmidt
INVENTOR
BY D. P. Davis
ATTORNEY Patented Nov. 7, 1922.

UNITED STATES PATENT OFFICE.

HENRY F. SCHMIDT, OF SWARTHMORE, PENNSYLVANIA, ASSIGNOR TO WESTINGHOUSE ELECTRIC & MANUFACTURING CO., A CORPORATION OF PENNSYLVANIA.

REDUCTION GEARING.

Original application filed August 31, 1917, Serial No 189,217. Divided and this application filed May 2, 1921. Serial No. 466,059.

*To all whom it may concern:*

Be it known that I, HENRY F. SCHMIDT, a citizen of the United States, and a resident of Swarthmore, in the county of Delaware and State of Pennsylvania, have invented a new and useful Improvement in Reduction Gearing (which is a division of application Serial No. 189,217, filed August 31, 1917), of which the following is a specification.

My invention relates to reduction gearing, particularly of the type intended for reducing the speed of steam turbines, and has for its object to provide apparatus of the character designated which shall be capable of counteracting any end thrust which may be imposed thereon in normal operation, as well as of securing equalization of tooth pressures.

Apparatus embodying features of my invention is illustrated on the accompanying drawings, forming a part of this application, in which the single figure is a sectional view of a turbine and reduction gear showing my improvement applied thereto.

In situations requiring the transmission of high power at high speeds, it is necessary that gearing having adequate strength shall be employed. Opposed helical or herring-bone gearing has frequently been used for this purpose on account of the fact that there is a continuous overlapping of tooth action; however, it is necessary that the tooth pressures in the two pairs of helical meshing gears be balanced or equalized in order to secure satisfactory operation. It is obvious that, if end thrust is imposed upon one of the gear members, the condition of equalized pressure is disturbed and it therefore becomes necessary to provide some means for counteracting the end thrust so that the condition of equalized tooth pressures may be preserved. Accordingly, I have devised gearing of the character designated which is inherently capable of counteracting end thrust, which may be imposed upon one of the gear members, in order to equalize tooth pressures.

Referring now more particularly to the drawing for a detailed description of my invention, a gear case 4 is shown having reduction gearing therein comprising a pinion member 5 meshing with a gear member 6. A turbine casing 7 is shown unitary with the gear casing 4.

The pinion member 5 includes reversely inclined helical gear portions 8 and 9 carried by the pinion shaft 10 journaled in bearings 11 and 12 carried by the gear case. The pinion portions 8 and 9 mesh with the gear portions 13 and 14 respectively of the driven gear 6 secured to the driven shaft 15 journaled in bearings 16 and 17 carried by the gear case 4. A thrust bearing 18 is associated with the shaft 15 in order to take end thrust, should the shaft be used in conjunction with an element, for example, a ship propeller, which, in operation, develops end thrust.

The pinion shaft 10 extends beyond the gear case 4 and into the turbine casing 7, the overhanging end thereof being provided with a turbine rotor disc 20 provided upon its periphery with a row of buckets or blades 21. As illustrated, the turbine is of the well known reentry type and comprises a steam inlet 22 communicating with one or more nozzles 23 designed to change the pressure energy of motive fluid into velocity energy and such nozzle or nozzles discharge high-velocity motive fluid directly against the blades 21. After passage between the blades 21 and having a portion of its velocity energy abstracted thereby, motive fluid enters the redirecting chamber or chambers 24 wherein its direction is changed so that it may be again impinged against the row of blades, thereby providing for the abstraction of the remaining available portion of the velocity energy. Exhaust motive fluid flows through the exhaust outlet 25 arranged at one side of the overhung turbine rotor disc 20, thereby allowing for the formation of a relatively large exhaust outlet which will permit the exhaust to flow away from the turbine casing with a minimum degree of resistance.

Appropriate packing devices are shown arranged between the turbine casing and the rotor and pinion shaft which include a water sealing gland 26 having a runner 27 of the usual type.

If the exhaust 25 communicates with a condenser, it will be apparent that the pressure existing within the turbine casing may be considerably below atmospheric. In view of the fact that the turbine rotor is overhung, without the possibility of balancing against external pressures, it will be apparent that atmospheric pressure on one side of the runner 27 will predominate over the low pressure existing on the turbine side of the runner and that the shaft 12 will therefore have thrust pressure towards the right imposed upon it.

In accordance with my invention, I have, therefore, provided pinion and gear portions 9 and 14 which are relatively longer than the pinion and gear portions 8 and 13 in order to counteract the effect of thrust resulting from the difference in pressures on opposite sides of the runner 27 and to therefore secure an equalization of tooth pressures. With gears employing the herringbone arrangement of gear teeth, this unbalanced thrust pressure is taken up by one set of gear teeth, and, consequently that set is subject to materially greater tooth pressure than the other set. For the purpose of equalizing the tooth pressures and uniformly distributing the working pressure over the two sets of teeth, I contemplate making the tooth faces of the two sets of unequal length. For example, in the drawing, the tooth faces of the set of pinion and gear tooth faces 9 and 14 may be made approximately twice the length of the set of tooth faces 8 and 13. It will, of course, be apparent that the difference in length of the tooth faces of the two sets will depend upon the lateral thrust encountered.

It is to be understood that my design of gearing may be employed wherever its use may be advantageous. Hence, in its broader aspects, my invention is not limited for use in connection with a steam turbine, the latter use having been described somewhat in detail in order to indicate one example of application of my invention. It will be apparent to those skilled in the art that one pair of meshing pinion and gear portions may be made longer than the other pair in order to counteract any lateral thrust imposed by any means upon either of the shafts associated with the gearing. For example, mechanical thrust may be imposed upon the shaft 12 due to other gearing, or propeller or other thrust imposed upon the shaft 15 of the gear which may be taken care of in a similar manner.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a gearing device, the combination of a shaft, means connected to the shaft and imposing end thrust on the latter in operation, a first gear connected to the shaft and having opposed sets of helical teeth, and a second gear having opposed sets of helical teeth meshing with the teeth of the first gear, the tooth faces of one pair of meshing sets of helical teeth being longer than the tooth faces of the other pair to counteract the end thrust of said means and to secure equalization of tooth pressures.

2. In a reduction gear, the combination of a driving shaft, driving means connected to the driving shaft and imposing end thrust on the latter in operation, a driving pinion connected to the driving shaft and having sets of opposed helical teeth, and a driven gear having sets of opposed helical teeth meshing with the pinion teeth, the tooth faces of one pair of meshing sets of helical teeth being longer than the tooth faces of the other pair to counteract the end thrust of said driving means and to secure equalization of tooth pressures.

3. In combination with the driving and driven gear of a transmission gearing, a turbine rotor element mounted on the shaft of the driving gear, and gear teeth formed in two oppositely inclined sets on said gears with the teeth faces of different length in the two sets for the purpose of taking up the lateral thrust occasioned by the turbine and of equalizing tooth pressures between the two sets.

4. In combination in a geared turbine unit, a driving gear having two sets of gear teeth with the tooth faces of one set longer than the tooth faces of the other set, a driven gear having correspondingly formed gear teeth meshing with the teeth of the driving gear and a turbine mounted on the shaft of the driving gear and subjecting the gear to a lateral thrust.

5. In a geared turbine system, a rotor, a shaft co-axial with the rotor and connected thereto, a double helical pinion on said shaft, the oppositely inclined parts of said pinion being of unequal length whereby the pressure per unit length of tooth of the intermeshing double helical pinion will be uniform, substantially as described.

6. In a geared turbine system a rotor, a shaft co-axial with the rotor and connected thereto, a double helical pinion on said shaft, the oppositely inclined parts of said pinion being of unequal length whereby the longitudinal thrust of the turbine rotor is balanced by an equal and opposite longitudinal thrust of the double helical pinion when power is being transmitted through said pinion, substantially as described.

In testimony whereof, I have hereunto subscribed my name this 28th day of April, 1921.

HENRY F. SCHMIDT.